United States Patent

[11] 3,612,100

[72] Inventor Martin Kapeker
 41 Decker St., Copiague, N.Y. 11726
[21] Appl. No. 27,502
[22] Filed Apr. 13, 1970
[45] Patented Oct. 12, 1971

[54] VACUUM VALVE
 10 Claims, 5 Drawing Figs.
[52] U.S. Cl. .................................................. 137/556.6,
 141/57, 141/65, 141/363, 137/625.17, 137/589
[51] Int. Cl. ......................................................... F16k 11/07,
 F16k 37/00
[50] Field of Search ........................................ 137/556.6,
 625.22, 625.24, 625.17, 625.25, 625.26, 625.27,
 583, 588, 589; 141/57, 65, 363

[56] References Cited
 UNITED STATES PATENTS
| | | | |
|---|---|---|---|
| 2,416,581 | 2/1947 | Harr | 137/583 X |
| 2,046,474 | 7/1936 | Maggenti | 137/588 |
| 3,187,770 | 6/1965 | Plamann | 137/589 |
| 3,533,443 | 10/1970 | Jones | 137/625.17 |
| 3,556,143 | 1/1971 | Nally | 137/625.26 X |

*Primary Examiner*—Henry T. Klinksiek
*Attorney*—Hane, Baxley & Spiecens

ABSTRACT: A valve for connecting a flask, an ampul, or any other vessel to be evacuated to a vacuum supply system comprises a tube with which a second tube communicates at a point intermediate the ends of the first tube. One end of the first tube is attachable to a port of the supply system and the other end of the tube is closed by an end wall. The free end of the second tube serves as connector for the flask, etc. to be evacuated. A plunger within the first tube can be displaced by a rod extended through an opening in the end wall of the tube either into a position in which the second tube is connected to the port through the first tube or into a position in which it is closed off from the port. While the second tube is closed off from the port, it can be connected to the atmosphere via a vent port in the end wall of the first tube by turning the plunger into a predetermined angular position in which a slot in the wall of the rod is in registry with the vent and also in connection with the second tube. The resulting venting of the second tube breaks the vacuum produced in a flask etc. attached to the second tube. The flask can now be removed from the valve without disturbing the vacuum in the supply system.

PATENTED OCT 12 1971  3,612,100

INVENTOR.
MARTIN KAPEKER
BY Hane, Baxley and Spiecens
ATTORNEYS

VACUUM VALVE

The invention relates to a valve and more particularly to a valve for use in the field of freeze-drying, and air or gas evacuation.

BACKGROUND

Valves of the general type above referred to are used to connect, directly or via a coupling, a flask, ampule or other vessel containing material such as organic material to be dried or otherwise processed or a tube such as a radio tube, to a vacuum supply system. It is essential that such connection be made in a manner such as to allow substantially unrestricted operation of the process and that upon completion of the process the flask, etc. containing the now processed material or the tube can be removed and another flask, tube, etc. can be connected without disturbing the operational conditions such as the vacuum and the temperature within the supply system.

A vacuum valve suitable for the above outlined purpose is described in my prior U.S. Pat. Ser. No. 3,165,386 issued Jan. 12, 1965.

While the valve according to my prior patent is functionally entirely satisfactory, the operation of the valve tends to be somewhat cumbersome and time consuming.

THE INVENTION

It is an important object of the invention to provide a novel and improved valve of the general kind above referred to with which flasks, ampules, tubes and other vessels can be rapidly connected to and disconnected from a vacuum supply system for replacement by another flask, etc. without disturbing the operational conditions within the system.

Another important object of the invention is to provide a novel improved valve of the general kind above referred to which permits an easily controllable breaking of the vacuum in the flask, etc. connected to the vacuum supply system while maintaining the port of the system fully sealed off from the valve.

Still another important object of the invention is to provide a novel and improved valve of the general kind above referred to which includes a vent port the opening and closing of which can be accurately and conveniently controlled without affecting in any way the seal between the valve and the vacuum system.

SUMMARY OF THE INVENTION

The aforepointed out objects, features and advantages and other objects, features and advantages which will be pointed out hereinafter may be obtained by providing a first tube which is open at one end for fitting this end upon the port of the vacuum supply system and terminates at its other end in an end wall. A second tube communicates at one end with the first tube at an intermediate portion thereof while the other end of the second tube constitutes a connector for the vessel to be evacuated. A plunger is slideable within the first tube by means of a rod extended through an opening in an end wall of the tube. The plunger can be selectively placed either in an evacuating position in which the second tube is in communication with the first tube and thus with the port of the vacuum supply system or a closing position in which the second tube is closed off from the port. The rod defines within the first tube a space which communicates with the second tube when the plunger is in the closing position and which can be connected to the atmosphere via a vent port in the end wall of the first tube and a slot in the outer wall of the connecting rod by moving the plunger into the closing position and then turning the rod into an angular position in which the slot and the vent port are in registry.

Coacting markings on the outside of the first tube and on a portion of the rod protruding from the end wall may be provided to indicate visually whether the slot and the vent port are in registry or in other words, whether or not the valve is set for breaking the vacuum in the vessel, etc. connected to the valve.

The protruding end of the rod preferably mounts a grip or knob from which a pointer protrudes thereby facilitating accurate and gradual setting of the slot in the plunger with reference to the vent port of the first tube.

DETAILED DESCRIPTION OF THE INVENTION

In the accompanying drawings a preferred embodiment of the invention is shown by way of illustration and not by way of limitation.

Figure 1:
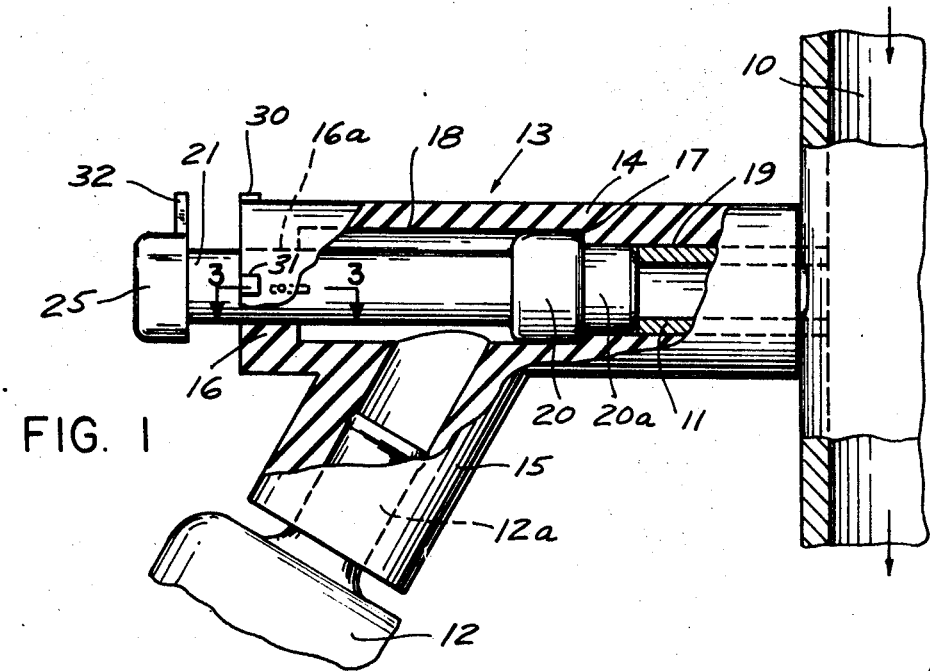
FIG. 1 is a lengthwise sectional view of a vacuum valve according to the invention coupled to a port of a vacuum supply system, the valve being shown in the operational position for breaking the vacuum in an evacuated vessel.

Referring now to the figures in greater detail, there is diagrammatically shown a part of a manifold pipe 10 of a vacuum supply system having a plurality of ports 11 (only one being shown). The supply system should be visualized as being designed in accordance with the specific process to be performed; it may for instance be part of a freeze-drier of the kind described in my prior U.S. Pat. Ser. No. 3,165,386. As far as the present invention is concerned, it is only essential to note that pipe 10 is continuously under vacuum while the system is in operation and that the vacuum and possibly also other conditions such as temperature in the system are not disturbed when a vessel to be evacuated is connected to or disconnected from the system as will be more fully described hereinafter. The vessel to be evacuated may be a flask as is indicated at 12. It may also be a tube such as a radio tube or a pipe coupling connected to a treatment station.

The invention resides in the structure of the valve itself. Valve 13 as shown comprises a first tube 14 and a second tube 15 which communicates with the first tube at an intermediate portion thereof. The two tubes can be secured to each other in any suitable and technically satisfactory manner but it is generally advantageous to form the valve body as a one-piece body as is shown.

Tube 14 is open at one end and closed at the other end by an end wall 16, the open end of tube 14 serving as a connector fittable upon port 11 as is shown. The open end of tube 15 similarly serves as a connector for the flask 12 or other object to be evacuated.

While it is possible to obtain an airtight fit between the tube ends and port 11 and flask 12, respectively, by suitable sealing means, it is generally advantageous and more convenient to make the tubes of a resilient material and to dimension the inner diameters of the tubes so that they will receive the port and the neck 12a of the flask with an airtight pressure fit. Neoprene rubber has been found to be an advantageous material for making the valve body. As is best shown in FIG. 1, tube 14 is shouldered at 17 to form within the tube a wide portion 18 and a portion 19 of reduced diameter.

A plunger 20 is slideable within the wide portion of the tube and is mounted for this purpose on a connecting rod 21 extended through an opening 16a in end wall 16 with an airtight fit. The side of the plunger opposite rod 21 may be extended by a cylindrical portion 20a the diameter of which is such that it fits narrow tube portion 19 with close tolerance. The plunger and its extension are advantageously made of polypropylene. The portion of rod 21 protruding from an end wall 16 mounts a knob or handle 25 for conveniently displacing the plunger within tube 14.

End wall 16 includes a vent port 26 leading from opening 16a to the outside wall of tube 14, that is, to the atmosphere. Rod 21 has in its peripheral wall a depression in the form of an elongate slot 27. The axial location and length of slot 27 are such that one end of the slot is located within space 18 and the other end is in radial alignment with vent port 26 when plunger 20 is in the position of FIG. 1. As is now apparent, vent port 26 and slot 27 constitute a valve means the opening and closing of which is controlled by the axial and angular position of rod 21.

Visual indicating means such as preferably raised markers 30 and 31 are provided on the outside wall of tube 14. These markers coact with a marker on knob 25 such as a pointer 32 to indicate the angular position of slot 27 with reference to vent port 26 as will be more fully explained hereinafter.

The operation of the valve as hereinbefore described is as follows.

Let it be assumed that it is intended to connect the valve to port 11. To prepare the valve for such connection without disturbing the conditions in the vacuum system, the plunger is fully pushed in, that is, into the position of FIG. 1 or FIG. 4 in which the plunger abuts shoulder 17. In this position of the plunger tube 15 is closed off from tube 14 as is best shown in FIG. 1; in other words, port 11 is sealed off. The sealing as effected by plunger 20 is further strengthened by engagement of extension 20a with the inner wall of tube 14. Moreover, the face of the extension abuts against the end of the port 11. The vacuum system can now be placed under suction.

Figure 5:
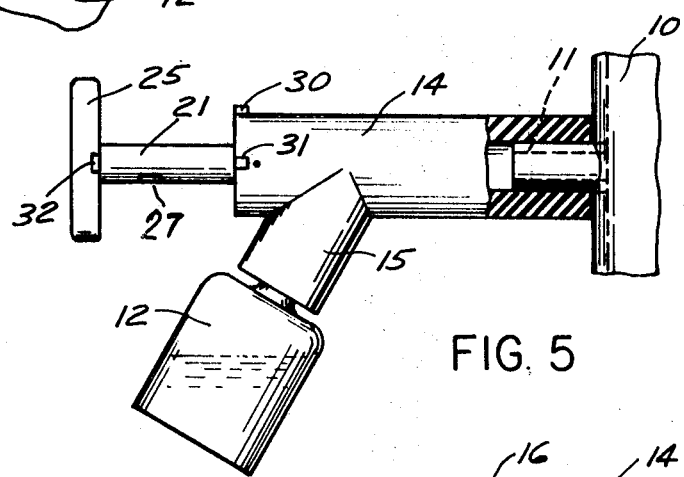
FIG. 5 is a side view, partly in section, showing the valve set for evacuating a vessel connected to the valve.

Flask 12 may now be fitted with its neck portion 12a into tube 15 as best shown in FIG. 1. The plunger may now or prior to placement of the valve upon port 11 be turned into an angular position in which pointer 32 is in axial alignment with marker 31, or at least into a position in which the pointer is well circumferentially spaced from marker 30. To effect evacuation of flask 12, the plunger is pulled back until it is stopped by end wall 16 as is shown in FIG. 5. As a result, tube 15 and thus flask 12 are now in communication with port 11 through tube 14 so that the flask and material therein are evacuated.

Figure 4:
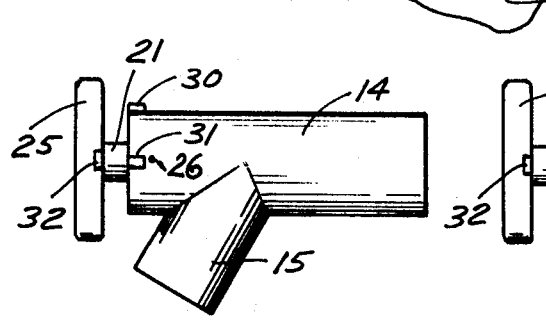
FIG. 4 is a side view of the valve shown in an operational position different from that of FIG. 1.
Figure 2:
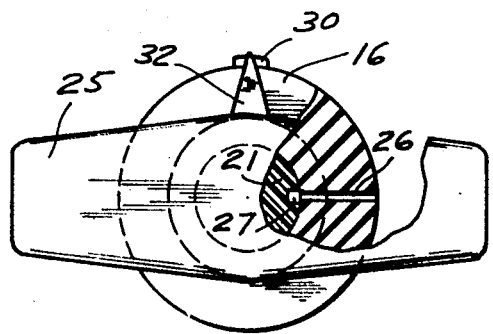
FIG. 2 is an end view, partly in section, upon the valve of FIG. 1.
Figure 3:
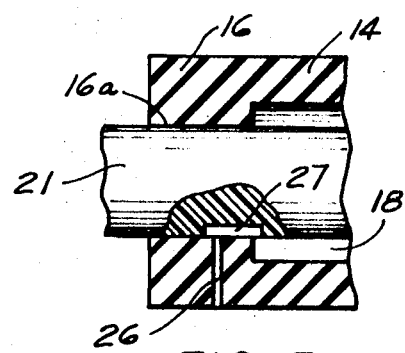
FIG. 3 is a section taken on line 3—3 of FIG. 1.

To remove the flask after completion of the processing of the material without disturbing the vacuum in pipe 10 and to connect another flask to port 11, the plunger is pushed back into the end position shown in FIGS. 1 or 4 thereby interrupting the connection between tubes 14 and 15 and knob 25 is slowly turned until pointer 32 is in axial alignment with marker 30 as is shown in FIGS. 2 and 4. As a result, slot 27 is placed in the position of FIG. 3, that is, in a position in which one end of the slot is in radial alignment with vent port 26 and the other end with space 18 which in turn, is in communication with tube 15. Accordingly, flask 12 is vented via tube 15, space 18, slot 27 and port 26. The vented flask is now ready for removal and a new flask, tube or other object to be evacuated can be connected and a new cycle started.

As is evident, venting of the flask can be effected very gently so that the material in the flask is not disturbed by moving pointer 32 very slowly into its position of alignment with marker 30.

While markers 30 and 31 are shown to be located at the top and at the side of tube 14 respectively, that is, separated by a 90° angle, other locations of the markers can, of course, be selected. It is only essential that alignment of pointer 32 with one marker indicates the vent position of the valve and alignment with other marker the fully sealed position of the valve.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A valve for connecting a vessel to be evacuated to a port of a vacuum supply system, said valve comprising:
   a first tubular member open at one end for fitting said end upon the port of the supply system and terminating at its other end in an end wall including an opening;
   a second tubular member connected at one end to an intermediate portion of said first member, the other end of the second member constituting a connector for the vessel to be evacuated;
   a plunger axially slideable in said first tubular member in an airtight fit with the inner wall thereof, said plunger being slideable between an evacuating position in which the second tubular member is in communication with said one end of the first tubular member and a closing position in which said communication is closed by the plunger;
   a connecting rod is slideably extended through said end wall opening and mounting said plunger to move the same selectively into either one of said positions by correspondingly displacing the plunger, said rod defining within the first tubular member a space in communication with the second tubular member when the plunger is in its closing position; and
   valve means between said end wall and said rod for connecting said space with the atmosphere, the opening and closing of said valve means being controlled by the axial and angular position of said rod with reference to the first tubular member.

2. The valve according to claim 1 wherein said first tubular member includes stop means limiting displacement of the plunger within the first tubular member to said two positions, one of said stop means being constituted by said end wall and the other by a shoulder on the inside wall of the first tubular member.

3. The valve according to claim 1 wherein the plunger has on its side opposite the one mounting said rod an extension of a smaller cross section than the cross section of the plunger, the inner wall of the first tubular member having between said shoulder and its said one end a cross section closely fitting the peripheral outline of said extension.

4. The valve according to claim 1 wherein said tubular members are a one-piece body, the second tubular member extending at an angle from the first tubular member and issuing into the same.

5. The valve according to claim 4 wherein said one-piece body is made of neoprene rubber and the plunger is made of a polypropylene.

6. A valve for connecting a vessel to be evacuated to a port of a vacuum supply system, said valve comprising:
   a first tubular member open at one end for fitting said end upon the port of the supply system and terminating at its other end in an end wall including an opening:
   a second tubular member connected at one end to an intermediate portion of said first member, the other end of the second member constituting a connector for a vessel to be evacuated;
   a plunger axially slideable in said first tubular member in an airtight fit with the inner wall thereof, said plunger being slideable between an evacuating position in which the second tubular member is in communication with said one end of the first tubular member and a closing position in which said communication is closed by the plunger; and
   a connecting rod slideably extended through said end wall opening and mounting said plunger to move the same selectively into either one of said positions by correspondingly displacing the plunger, said rod defining within the first tubular member a space in communication with the second tubular member when the plunger is in its closing position, said end wall including a radially extending vent port connecting the end wall opening with the atmosphere and said rod including in its outer wall a depression connecting said space with said vent port when the plunger is in its closing position and said rod is in a predetermined angular position with reference to said end wall thereby connecting the second tubular member with the atmosphere via said space, said recess and said vent port.

7. The valve according to claim 6 wherein said depression is in the form of an axially elongate slot, one end portion of said slot being located in registry with said vent port and the other end portion being located in said space when the plunger is in its closing position.

8. The valve according to claim 6 and comprising indicating means for visually indicating the angular position of said depression relative to said vent port.

9. The valve according to claim 8 wherein said connecting rod and the outside of said tubular member bear correlated markings indicating when the vent port and the depression are respectively in and out of registry.

10. The valve according to claim 9 wherein said first tubular member has on its outer peripheral wall two circumferentially spaced markings, one signifying the position of registry and the other a position of nonregistry of the vent port and the depression, and wherein said connecting rod has on a portion outwardly protruding from said end wall a marker placeable in axial alignment with either one of the markings on the first tubular member by turning the rod with reference to said first tubular member thereby indicating whether said space within the first tubular member is connected to the atmosphere.